United States Patent
Adoc, Jr. et al.

(10) Patent No.: US 9,589,042 B1
(45) Date of Patent: *Mar. 7, 2017

(54) IDEMPOTENTCY OF APPLICATION STATE DATA

(71) Applicant: Amazon Technologies, Inc., Seattle, WA (US)

(72) Inventors: Mario Vargas Adoc, Jr., San Francisco, CA (US); Richard David Krog, Seattle, WA (US); Kerry Chang, Seattle, WA (US); Jeremy Stephen Hynoski, Seattle, WA (US); Christopher Lawrence Lavin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/005,317

(22) Filed: Jan. 25, 2016

Related U.S. Application Data

(63) Continuation of application No. 13/921,735, filed on Jun. 19, 2013, now Pat. No. 9,244,994.

(51) Int. Cl.
  *G06F 17/00* (2006.01)
  *G06F 17/30* (2006.01)
  *H04L 29/08* (2006.01)

(52) U.S. Cl.
  CPC .. *G06F 17/30578* (2013.01); *G06F 17/30286* (2013.01); *G06F 17/30345* (2013.01); *H04L 67/1095* (2013.01)

(58) Field of Classification Search
  CPC ...... A63F 2300/5553; A63F 2300/5526; A63F 2300/57; A63F 2300/572; A63F 2300/577; A63F 2300/5533; A63F 2300/5546; A63F 2300/55; A63F 2300/204; G06K 9/00342; G06F 17/30575; G06F 17/30286; G06F 17/30846; G06F 17/30858

See application file for complete search history.

(56) References Cited

U.S. PATENT DOCUMENTS

| | | | |
|---|---|---|---|
| 8,734,255 B2 | 5/2014 | van Os et al. | |
| 9,244,994 B1* | 1/2016 | Adoc, Jr. | ........ G06F 17/30575 |
| 2010/0279774 A1 | 11/2010 | Braig et al. | |
| 2011/0086712 A1 | 4/2011 | Cargill | |
| 2011/0107239 A1* | 5/2011 | Adoni | ............ A63F 13/12 715/757 |
| 2014/0187315 A1 | 7/2014 | Perry | |

OTHER PUBLICATIONS

U.S. Appl. No. 13/912,503, filed Jun. 19, 2013 and entitled "Management of Application State Data".
U.S. Appl. No. 13/850,119, filed Mar. 25, 2013 and entitled "Resovling Conflicts Within Saved State Data".

\* cited by examiner

*Primary Examiner* — Cheryl Lewis
(74) *Attorney, Agent, or Firm* — Thomas | Horstemeyer, LLP

(57) ABSTRACT

Disclosed are various embodiments for synchronizing application state information across devices. More specifically, embodiments of the disclosure are related to facilitating idempotency of application state information. Idempotency is maintained by using a timestamp embedded within application state information and/or by determining that the application state information is associated with an accumulating value.

20 Claims, 9 Drawing Sheets

Application State Information 241a 301  303
"AccumulatingValue:coinBalance": {      305
    "deviceID": 3562XG2,
    "contribution": 57,
    "timestamp": 136398434
}                                    307

FIG. 3A

Application State Information 241b

"AccumulatingValue:coinBalance": {      309
    "deviceID": 3562XG1,
    "contribution": 68,
    "timestamp": 137399901
}                                    311

FIG. 3B

IDEMPOTENTCY OF APPLICATION STATE DATA

CROSS-REFERENCE TO RELATED APPLICATIONS

This application is a division of and claims the benefit of U.S. patent application Ser. No. 13/921,735, entitled "IDEMPOTENCY OF APPLICATION STATE DATA," and filed Jun. 19, 2013, which is hereby incorporated by reference in its entirety.

BACKGROUND

Applications that are distributed via an application marketplace are often installed on multiple devices by a user. A developer of an application may wish to synchronize state information across the multiple installations across various devices of a particular application. The state information generated by various devices associated with the user may create synchronization conflicts. Therefore, idempotency of operations that update a repository of saved state data may be desirable.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 3A-3B are representations of application state information generated by applications according to various embodiments of the present disclosure.

DETAILED DESCRIPTION

The present disclosure relates to synchronizing data associated with the state of an application between multiple devices that may be associated with a user. Applications that are distributed via an application marketplace are often installed on multiple devices associated with a user account. For example, a user may own a tablet device as well as a smartphone and install an application distributed by the application marketplace on both devices. Accordingly, embodiments of the disclosure can facilitate synchronization of data relating to the application across the various devices associated with the user by employing an application synchronization service to which applications report application state information, which can in turn facilitate synchronization of application state information across multiple devices.

When an application is a game application, application state information can comprise, for example, information that is related to game applications, such as scoring data, game progress, game achievements, game timing information, time stamps, and any other information relating to execution of a game. Application state information can also related to media such as books, movies, music, etc., that are rendered or consumed via a media player application. In this scenario, the application state information can relate to a page number and/or time code within media that a user last viewed and/or consumed. Application state information can also include information related to an accumulating value, such as a report indicating the user's accumulation and/or usage or spending of coins or points during a gameplay session. Therefore, embodiments of the present disclosure provide mechanisms to provide for the idem potency of operations that synchronize certain application state information by an application synchronization service. In the context of the present disclosure, idem potent operations are operations that may be applied multiple times without corrupting the value of data stored or synchronized into a data store by the application synchronization service.

Figure 1A:
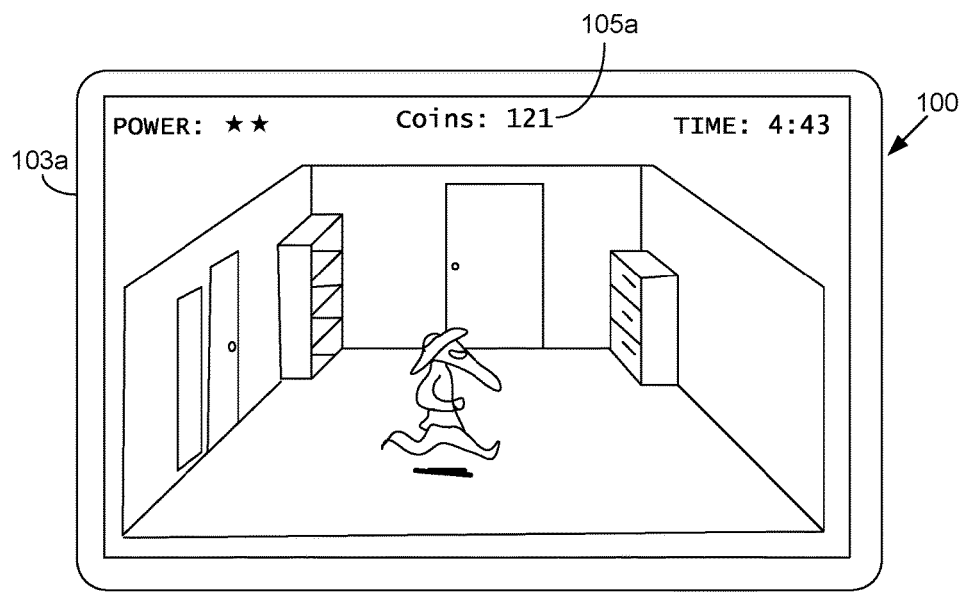
FIGS. 1A-1B are drawings of an example application executed by client devices according to various embodiments of the present disclosure.
Figure 1B:
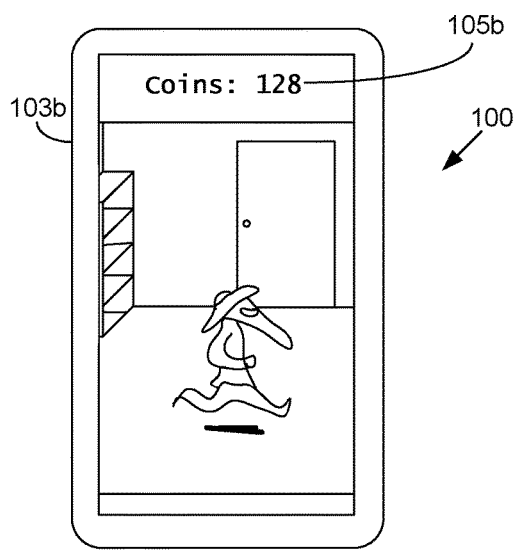

With reference to FIGS. 1A-1B, shown is an example scenario in which an application is executed by client devices 103a and 103b. In the scenario 100 shown in FIGS. 1A-1B, the application can be distributed by an application marketplace. In the example of FIGS. 1A-1B, the client devices 103a and 103b are associated with a particular user account. In other words, the user has installed the same application on multiple devices. An application synchronization service can be associated with the application marketplace and/or independent from an application marketplace and facilitates synchronization of game state data.

As shown in the example of FIG. 1A, an application instance is executed by the client device 103a can incorporate functionality in which a user may utilize an account held with a third party service for the purpose of tracking accumulation of coins or points, tracking achievements, game progress, game scores, or any other data related to the state of an application that can be saved. Accordingly, an application can be bundled with a software library and/or code fragments that facilitate the creation of application state information in a data structure that can be transmitted to a synchronization service. As shown in the client device 103b that is also associated with the user, another application instance corresponding to the same application may be executed by another device associated with the user.

Accordingly, each application instance may report, for example, scoring information corresponding to an accumulated coin balance 105a or 105b of the user. Such an accumulating value, for example, comprise a running total of coins or points earned by and assigned to the user across all instances of execution of the application that are associated with a particular user account. Accordingly, as shown in the scenario of FIGS. 1A and 1B, the user may earn coins in a gameplay session on a first device as well as on a second device, with the accumulating value or the number of earned coins being synchronized across the devices of the user being facilitated by embodiments of the disclosure. To facilitate such synchronization, applications executed by the client devices 103 can be instrumented to report a contribution to an accumulated total that is attributable the particular client device 103 on which the application is executed.

Embodiments of the disclosure can also facilitate idempotence of reporting of such data by client devices 103 with respect to synchronization and storage of the data in a data store. Embodiments of the disclosure can also facilitate idempotence of reporting of such data by client devices 103 with respect to synchronization and storage of the data in a data store. In the following discussion, a general description of the system and its components is provided, followed by a discussion of the operation of the same.

Figure 2:
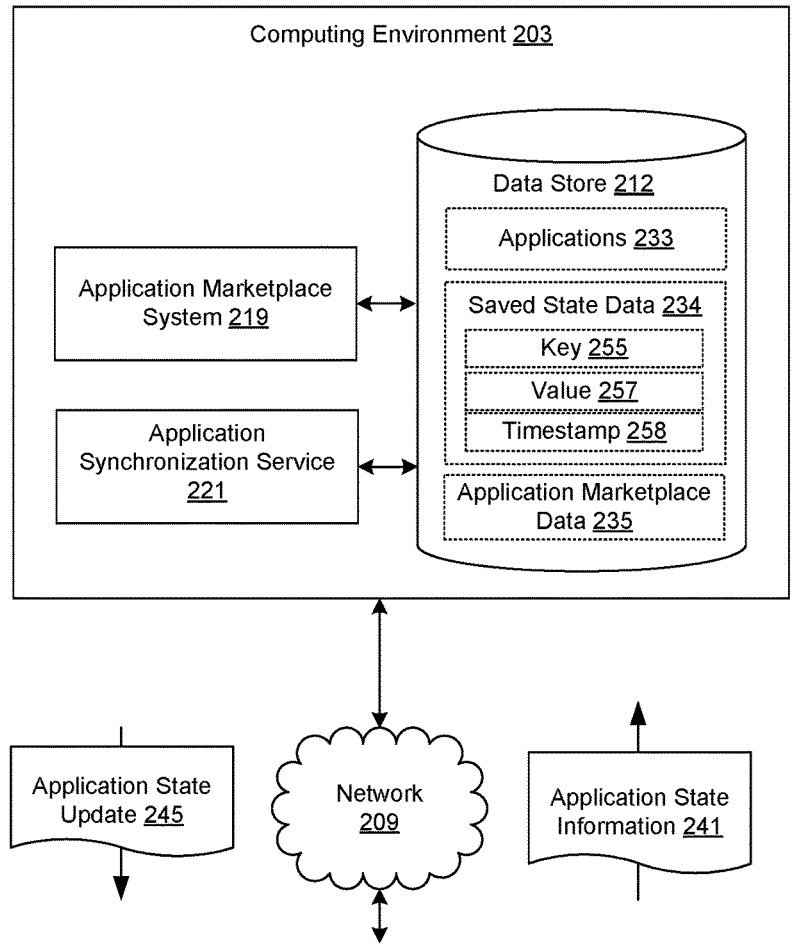
FIG. 2 is a drawing of a networked environment according to various embodiments of the present disclosure.

Turning now to FIG. 2, shown is a networked environment 200 according to various embodiments. The networked environment 200 includes a computing environment 203 and one or more client devices 103 in data communication via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an application marketplace system 219, application synchronization service 221 and other applications, services, processes, systems, engines, or functionality not discussed in detail herein. The application marketplace system 219 may communicate with the client device 103 using various protocols such as, for example, hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the network 209.

The application marketplace system 219 is executed to provide functionality relating to an application marketplace in which a multitude of applications 233 may be submitted by developers and made available for purchase and/or download by users. The application marketplace system 219 may include functionality relating to electronic commerce, e.g., shopping cart, ordering, and payment systems. The application marketplace system 219 may support searching and categorization functionality so that users may easily locate applications 233 that are of interest. The application marketplace system 219 may include functionality relating to verification of compatibility of applications 233 with various client devices 103.

The application synchronization service 221 is executed to synchronize application state information 241 associated with instances of applications 233 executed by various client devices 103 that are associated with a user account. Application state information 241 can include information relating to application usage that is associated with an application instance executed by a client device 103. For example, application state information 241 can include a score or achievement achieved by a user in an application instance. Application state information 241 can also include saved game data, or a score, level, or other state information from which a user may resume gameplay at a later point in time on the same client device 103 or another client device 103.

The data stored in the data store 212 includes, for example, applications 233, saved state data 234 relating to applications 233 that are executed by client devices 103, application marketplace data 235, and potentially other data. The applications 233 correspond to those applications 233 that have been submitted by developers and/or others, for example, for inclusion in the application marketplace. The application 233 may correspond, for example, to a game or other types of applications. As non-limiting examples, application 233 may correspond to a first-person shooter game, an action game, an adventure game, a party game, a role-playing game, a simulation game, a strategy game, a vehicle simulation game, and/or other types of games.

The application 233 may be a game originally designed for execution in a general-purpose computing device or in a specialized video game device such as, for example, a video game console, a handheld game device, an arcade game device, etc. The applications 233 may also correspond to mobile phone applications, computer-aided design (CAD) applications, computer-aided manufacturing (CAM) applications, photo manipulation applications, video editing applications, office productivity applications, operating systems and associated applications, emulators for operating systems, architectures, and capabilities not present on a consumer device, and other applications and combinations of applications. Where game applications are mentioned in the following text, it is understood that game applications are merely examples of the many different types of applications 233.

The application 233, when executed by a client device 103, may expect to access one or more resources of the client device on which it is executed. Such resources may correspond to display devices, input devices, or other devices. In some cases, the application 233 may request exclusive access to one or more of the resources, whereby no other applications may have access to the particular resources. Each application 233 may include, for example, object code, binary code, source code, metadata and/or other data. The object code corresponds to code that is executable by client devices 103, either natively by a processor or by way of a virtual machine executed by the processor.

The saved state data 234 that is maintained by the application marketplace system 219 includes various data relating to execution of applications 233 by client devices 103. For example, the saved state data 234 may include one or more accumulated totals, such as a coin balance or point balance, information about progress of a user within execution of an application by users, such as a level at which a user has progressed within a game, scoring information, achievement information relating to a game, etc. Saved state data 234 can be organized into various keys 255 and corresponding values 257, which can also be associated with a timestamp 258. Accordingly, a key 255 can represent an event name or an event type of an event occurring in an application 233 executed by a client device 103 that an application developer may wish to synchronize across the various devices of a user. The key 255 can also take the form of an event name or event identifier that is combined with a synchronization rule. The value 257 can represent the value associated with the event, such as a coin balance, point balance, score, lap time, level, page number, or any other data about application state that a developer wishes to synchronize across the various devices of a user.

In the case of a value 257 that corresponds to an accumulated total that is synchronized across the various devices associated with a user account, the saved state data 234 can also include data relating to a contribution to the accumulated total of one or more devices that are linked with the user account. In other words, in the case of a coin balance associated with a particular game application, the saved state data 234 can include, for each device linked to the user's account, a number of coins that are attributable to gameplay sessions occurring on a particular device. In other words, an application 233 can be instrumented to track its total contribution over time to an accumulating value and report the contribution to the application synchronization service 221 on a periodic basis or upon the occurrence of an event during execution of the application 233. In this scenario, the application 233 can also report an identifier associated with the client device 103 on which it is executed. Accordingly, the application synchronization service 221 can store the device identifier in association with a particular device's contribution to a total accumulating value. In turn, the application synchronization service 221 can determine a corresponding value for the accumulated total by summing the contributions of each device linked with a user's account.

In some scenarios, one or more contributions to a particular accumulated total may not necessarily be associated with a particular device. For example, a user may accumulate towards an accumulated total in ways that are device independent. For example, a contribution to an accumulated total may be assigned by an administrative user and/or a customer service agent on behalf of the user. A contribution to an accumulated total may be purchased by the user, and may therefore be a device independent contribution. An accumulated total may also be associated with a non-zero starting value, or a seed value. In this scenario, the application synchronization service 221 may determine a corresponding value of the accumulated total by summing the contributions of each device while also taking into account contributions to the accumulated total that are not associated with a particular client device 103.

In the case of a value 257 that corresponds to another type of value other than an accumulated total that is synchronized across the various devices associated with a user account, the saved state data 234 can also include a timestamp 258 associated with a particular key 255 and/or value 257 so that the application synchronization service 221 can determine whether given application state information 241 received from a client device 103 has already been received and stored within the data store 212. The timestamp 258 can be generated by the application 233 when the event occurs during execution of the application 233 that corresponds to the key 255 and/or value 257. In other words, the timestamp 258 corresponds to a moment at which a given event occurs within the application 233 and not when the key 255 and/or value 257 are stored in the data store 212 by the application synchronization service 221. In this scenario, the application synchronization service 221 can determine that data received from a client device 103 is duplicate application state information if a timestamp that is embedded within the application state information is a duplicate of a timestamp that has already been previously stored in the data store 212 by the application synchronization service 221.

The data associated with the application marketplace data 235 includes, for example, download information, categories, application usage data and/or other data. The download information indicates the popularity, either in terms of absolute number of downloads or in terms of relative popularity, of the applications 233 offered by the application marketplace data 235. The download information can also identify users, either individually by a user account and/or on an aggregate basis according to demographic category, who have downloaded a particular application 233. The categories correspond to groupings of applications 233 that may indicate similar applications 233 and may be employed by users to more easily navigate the offerings of the application marketplace data 235. Non-limiting examples of categories may include social networking applications 233, mapping applications 233, movie information applications 233, shopping applications 233, music recognition applications 233, and so on. The application marketplace data 235 can also include information about users, such as user profile data, user authentication information, usage data of users with regard to application 233 (e.g., game progress, high scores, achievements).

The client device 103 is representative of a plurality of client devices that may be coupled to the network 209. The client devices 103 may be geographically diverse. The client device 103 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client device 103 may include a display device. The display may comprise, for example, one or more devices such as cathode ray tubes (CRTs), liquid crystal display (LCD) screens, gas plasma-based flat panel displays, LCD projectors, or other types of display devices, etc. The client device 103 may include one or more input devices. The input devices may comprise, for example, devices such as keyboards, mice, joysticks, accelerometers, light guns, game controllers, touch pads, touch sticks, push buttons, optical sensors, microphones, webcams, and/or any other devices that can provide user input. Additionally, various input devices may incorporate haptic technologies in order to provide feedback to the user.

The client device 103 may be configured to execute various applications 233 that are distributed via the application marketplace system 219. An application 233 executed by a client device 103, as is noted above, can be configured to generate application state information 241 that is reported to the application synchronization service 221 and saved by the application synchronization service 221 as saved state data 234. The application state information 241 can comprise a data structure that includes data associated with an event occurring during execution of an instance of the application 233. For example, application state information 241 can include data related to an accumulating value, such as a coin balance of a user, associated with execution of the application 233 by a client device 103.

Various techniques relating to synchronization of application state information are described in U.S. patent application Ser. No. 13/850,119 entitled "RESOLVING CONFLICTS WITHIN SAVED STATE DATA" and filed Mar. 25, 2013; and U.S. patent application Ser. No. 13/921,503 entitled "MANAGEMENT OF APPLICATION STATE DATA," both of which are incorporated herein by reference in their entireties.

Next, a general description of the operation of the various components of the networked environment 200 is provided. To begin, an application 233 executing on a client device 103 can be instrumented upon the occurrence of an event within execution of an application instance to generate application state information 241 containing information about the event. For example, when a certain level and/or achievement within a game application is reached, the application 233 can generate application state information 241, which can be cached within the application state cache 236, which can be stored on the client device 103. As a user reaches certain milestones or accomplishes tasks within an application 233, the application 233 can be configured to award coins, points, or any other reward balance. Additionally, the user may spend these rewards to unlock portions of an application 233 and/or obtain other rewards or items, which cause a decrease in the accumulated total associated with the user. As yet another example, the user's progress within a game application can also be tracked and application state information 241 identifying scores, times (e.g., lap times, time to complete levels, time to reach milestones, etc.) or other state information associated with the application 233 can be generated.

The application 233 can generate application state information 241 by utilizing a software library having an application programming interface (API) provided by and/or associated with the application synchronization service 221 so that the application state information 241 can be created in a standardized data format. In other embodiments, the application 233 can be instrumented to generate application state information 241 in a standardized data format.

The data format corresponding to application state information 241 can be implemented as a text based data interchange format, such as JavaScript Object Notation (JSON), or any other standardized or proprietary data interchange format that can allow for the exchange of structured data. Accordingly, the application 233 executed by a client device 103 can generate and transmit application state information 241 to the application synchronization service 221, which can extract and store the application state information 241 as saved state data 234.

Application state information 241 may be transmitted by the application 233 to the application synchronization service 221 asynchronously from multiple client devices 103 as and when a particular client device 103 has the capability to transmit data via the network 209. For example, the application 233 can cache application state information 241 in the application state cache 236 on the client device 103 transmit the application state information 241 upon the occurrence of an event, such as termination of the application, network 209 accessibility, the reaching of a level and/or achievement within an application, when a local contribution corresponding to an accumulated total reaches a certain size, a size of the application state cache 236 reaching a threshold size, in real time as and when events are generated within an application instance corresponding to the application 233, or upon the occurrence of other events.

In one scenario, an event occurring within an application causes an accumulating value (e.g., user's coin balance, etc.) associated with a user account to change. Accordingly, the application state information 241 generated by the application 233 executed by the client device 103 includes data relating to the accumulating value. Accordingly, the application 233 is instrumented, via code fragments embedded within the application 233 and/or a software library or other code utilized by the application 233, to track a contribution to the accumulated total that is attributable to the client device 103 on which the application 233 is executing. In other words, the application 233 is configured to track and store within storage accessible to the client device 103 a total contribution to a particular accumulating value that is attributable to the various executions of the application 233 by the client device 103.

The application 233 is also instrumented to periodically report its contribution to the accumulating value in the form of application state information 241. The application 233 is also configured to embed a device identifier within the application state information 241 so that the application synchronization service 221 can store the contribution along with the device identifier in the data store 212. Accordingly, the application synchronization service 221 is configured to calculate an accumulating value that corresponds to a particular key (e.g., an event name) based at least in part upon the various contributions to the accumulating value that are obtained from the various client devices 103 associated with a user account and that are stored within the data store 212. For example, the application synchronization service 221 can sum the contributions associated with the various client devices 103 that are registered with a particular user account to calculate the accumulating value.

Because each client device 103 that is registered to a user account reports its total contribution to an accumulating value rather than each incremental change to an accumulating value that is attributable to execution of an application 233 by the client device 103, the application synchronization service 221 achieves idempotency of the operations that report updates the accumulating value. Because the total contribution of a particular client device 103 is reported instead of incremental changes, the "execution" of duplicate operations (the processing of duplicate application state information 241 updates) does not jeopardize the correctness of the accumulating value that is calculated by the application synchronization service 221.

Upon receiving an application state information 241 containing a contribution of a particular client device 103 towards an accumulating value corresponding to a key 255 and value 257 from a client device 103, the application synchronization service 221 can generate and transmit a response to the client device 103. The response can comprise an application state update 245 that includes a numeric value associated with the accumulating value corresponding to the key 255 and value 257 that are synchronized by the application synchronization service 221 among the various client devices 103 that are associated with or registered to a user account. In this way, the application 233 executed by the client device 103 can obtain an updated numeric value corresponding to the accumulating value that is stored as a value 257 in the data store 212.

In some scenarios, a client device 103 associated with a particular device identifier may undergo a data loss event, such as a factory reset in which data stored on the client device 103, such as a contribution corresponding to the client device 103 as well as a particular accumulating value, or a "local contribution," is lost and/or deleted from the device. Accordingly, the application 233 and/or code fragments employed by the application 233 to synchronize an accumulating value are configured to check a status flag that is stored in storage accessible to the client device 103 that indicates whether the client device 103 has previously synchronized the key 255 and value 257 corresponding to the accumulating value with the application synchronization service 221. If, according to the status flag, the client device 103 has not previously synchronized its contribution to the accumulating value with the application synchronization service 221, then the application 233 can transmit a request to retrieve its contribution to the accumulating value from the application synchronization service 221, where the request includes a device identifier corresponding the client device 103.

In response, the application synchronization service 221 can generate and transmit an application state update 245 that includes a numeric value corresponding to the accumulating value as well as a numeric value corresponding to the contribution to the accumulating value of the requesting client device 103. In this way, a device whose data storage has been wiped can learn its contribution to the accumulating value that is stored as a key 255 and value 257 in the data store 212. Additionally, in this scenario, when an application 233 is used immediately after the client device 103 has been wiped but before the application 233 is able to synchronize data with the application synchronization service 221, the application 233 can track a local contribution to the accumulating value that is stored in the client device 103 until the application 233 can request a numeric value corresponding to the contribution of the client device 103 to an accumulating value from the application synchronization service 221.

Upon receiving its contribution to the accumulating value from the application synchronization service 221, the client device 103 can then add the local contribution to the contribution received from the application synchronization service 221 and store the result as the new contribution of the client device 103 to the accumulating value.

In scenarios other than occurrence of an event within an application 233 that causes an accumulating value (e.g., user's coin balance, etc.) associated with a user account to change, the application 233 can be instrumented to generate application state information 241 that includes a timestamp. The application synchronization service 221 can then be configured to store the timestamp in association with a key 255 and/or value 257 that is embedded within the application state information 241 and stored in the data store 212.

In such a scenario, idempotency is achieved when application state information 241 is reported to the application synchronization service 221 by comparison of the timestamp extracted from the application state information 241 against the timestamp that is stored in association with the key 255 and/or value 257 in the data store 212. If the timestamp extracted from the application state information 241 is already stored within the data store 212 in association with the same key 255 and/or value 257 that is extracted from the application state information 241, then the application synchronization service 221 can determine that the application state information 241 is a duplicate application state information 241 and discard the duplicate. In some embodiments, the application synchronization service 221 can respond to the client device 103 submitting a duplicate with an error message or with the same message that was previously transmitted to the client device 103 as a response when the application state information 241 was initially reported to the application synchronization service 221.

Turning now to FIG. 3, shown is an example of application state information 241a and 241b that can be generated by various instances of an application 233 according to various embodiments of the disclosure. In the application state information 241a shown in FIG. 3, a text based data interchange data structure is generated by the application 233 that contains an indication 301 that a field within the data structure corresponds to an accumulating value that is stored as a key 255 and value 257 within the data store 212 as well as an event name 303. The event name 303, in some embodiments, can correspond to the key 255 that is stored within the data store 212 in association with a particular user account of a user.

The application state information 241a also includes a device identifier 305 so that the application synchronization service 221 may identify a client device 103 to which the application state information 241a corresponds. In some embodiments, the application marketplace data 235 can identify the various devices by a device identifier 305 that are registered to a particular user account. The application state information 241a can also include a contribution 307 to an accumulating value that is stored in the data store 212 and synchronized across the various client devices 103 that are registered to a user account within an application marketplace. Accordingly, the application synchronization service 221 can store the contribution 307 in association with the device identifier 305 in the data store 212. In some embodiments, a timestamp is also included within the application state information 241a. In the depicted example application state information 241a, a JSON data structure is employed. However, it should be appreciated that other data interchange formats can be employed for the application state information 241a.

In the application state information 241b, which can be generated by another instance of the application 233 that is executed by another client device 103, a differing device identifier 309 corresponds to the other client device 103. Additionally, a contribution 311 to an accumulating value that is stored on the data store 212 is also included in the application state information 241b. Accordingly, the application synchronization service 221 obtains the application state information 241a and 241b, the application synchronization service 221 can calculate an accumulating value based upon the various contributions that are associated with the client devices 103 registered with a particular user account. For example, the application synchronization service 221 can sum the contributions associated with the various client devices 103 to calculate the accumulating value corresponding to a particular key 255 in the data store 212.

Figure 4:
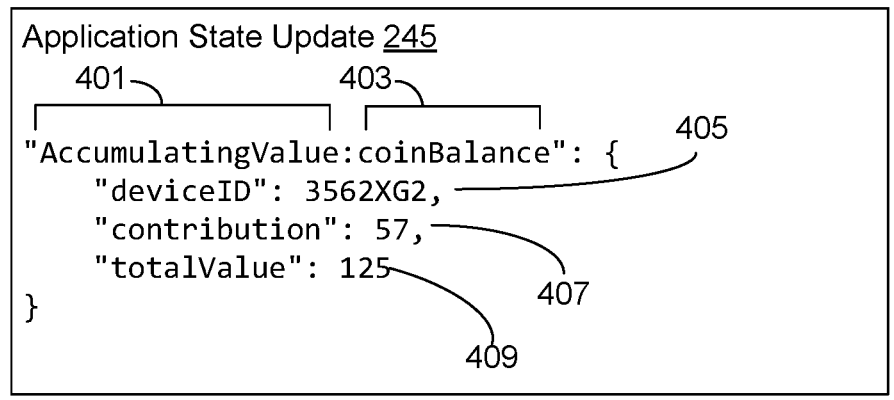
FIG. 4 is a representation of an application state update generated by the application synchronization service according to various embodiments of the present disclosure.

Moving on to FIG. 4, shown is an example of an application state update 245 that can be generated by the application synchronization service 221 in response to receiving a request for a contribution of a client device 103 to an accumulating value associated with a particular event and a particular user account. The depicted application state update 245 can also be generated in response to receiving application state information 241 from a client device 103. The application state update 245 can also be generated in response to receiving a request to synchronize data relating to the state of application 233 from a client device 103.

In the depicted example, the application state update 245 can include a data structure that includes an indication 401 that a field of the data structure corresponds to an accumulating value that is synchronized across multiple client devices 103 by the application synchronization service 221. Additionally, the data structure includes an event name 403, which can correspond to a key 255, that identifies the accumulating value. The data structure can also include a device identifier 405 that corresponds to the requesting client device 103 or the client device 103 to which the application state update 245 is transmitted by the application synchronization service 221. The data structure can also include a numeric value that corresponds to a contribution 407 to an accumulating value by the device associated with the device identifier 405. The data structure further includes a numeric value corresponding to the accumulating value 409 as calculated by the application synchronization service 221.

Figure 5:
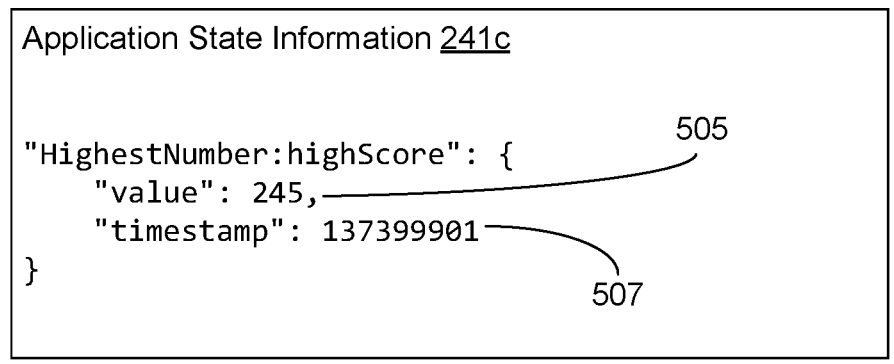
FIG. 5 is a representation of application state information generated by applications according to various embodiments of the present disclosure.

Moving on to FIG. 5, shown is an example of application state information 241c that can be generated by an application 233 and transmitted to the application synchronization service 221. In the depicted example, the application state information 241c includes, for example, an event value 505 corresponding to an event occurring within an application 233. Additionally, the application state information 241c can also include a timestamp 507 generated by an application 233 when an event corresponding to an event value occurs within the application 233. The application synchronization service 221 can utilize the timestamp to facilitate idempotency of data included within the depicted data structure as described above.

Figure 6:
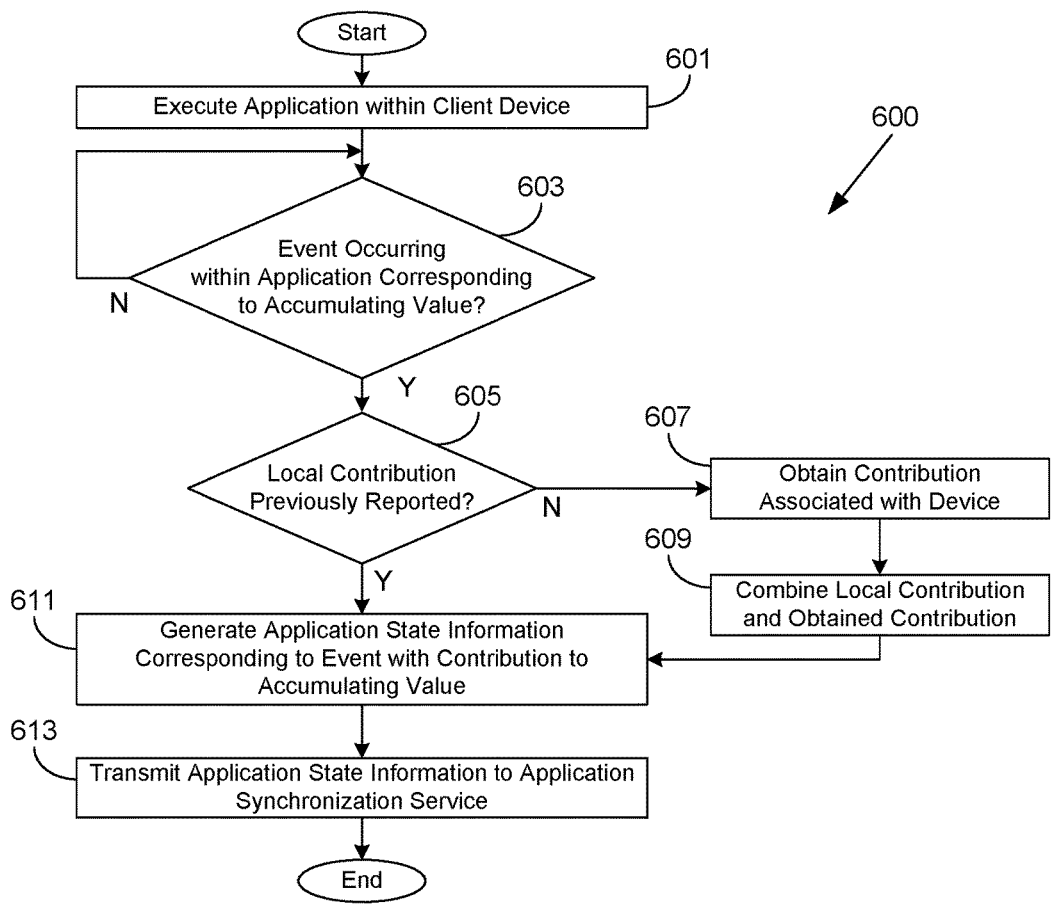
FIG. 6 is a flowchart illustrating one example of functionality implemented as portions of an application executed in a client device according to various embodiments of the present disclosure.

Referring next to FIG. 6, shown is a flowchart 600 that provides one example of execution of an application 233 executed by a client device 103 to generate application state information 241 or a portion of application state information 241 that includes an accumulating value according to various embodiments. It is understood that the flowchart of FIG. 6 provides merely an example of the many different types of functional arrangements that may be employed to implement the operation of the portion of an application 233 as described herein. As an alternative, the flowchart of FIG. 6 may be viewed as depicting an example of steps of a method implemented in the client device 103 that reports application state information to the application synchronization service 221 for synchronization of state information across multiple devices of a user according to one or more embodiments.

First, in box 601, the application 233 executes functionality associated with the application 233 in a client device 103. As described above, the application 233 has been instrumented by a developer to generate application state information 241 corresponding to events that the developer wishes to synchronize across multiple devices associated with a user account. In box 603, the application 233 determines whether an event corresponding to an accumulating value that is synchronized between various devices associated with a user account occurs within the client device 103.

If so, then in box 605, the application 233 determines whether a locally stored or local contribution associated with the application 233 executed on the client device 103 has been previously reported to the application synchronization service 221. If not, then at box 607, the application 233 obtains a numerical value associated with a contribution of the client device 103 that may be stored in the data store 212 by the application synchronization service 221. Next, at box 609, the application 233 sums the local contribution with the contribution value obtained from the application synchronization service 221 to calculate a contribution to be reported within a data structure incorporated within application state information 241. Thereafter, the application 233 proceeds to box 611.

If the application 233 determines at box 605 that the local contribution has been previously reported to the application synchronization service 221, then at box 611, the application 233 generates application state information 241 that includes a data structure associated with the accumulating value. At box 613, the application 233 transmits the application state information 241 to the application synchronization service 221. Thereafter, the process shown in FIG. 6 proceeds to completion.

Figure 7:
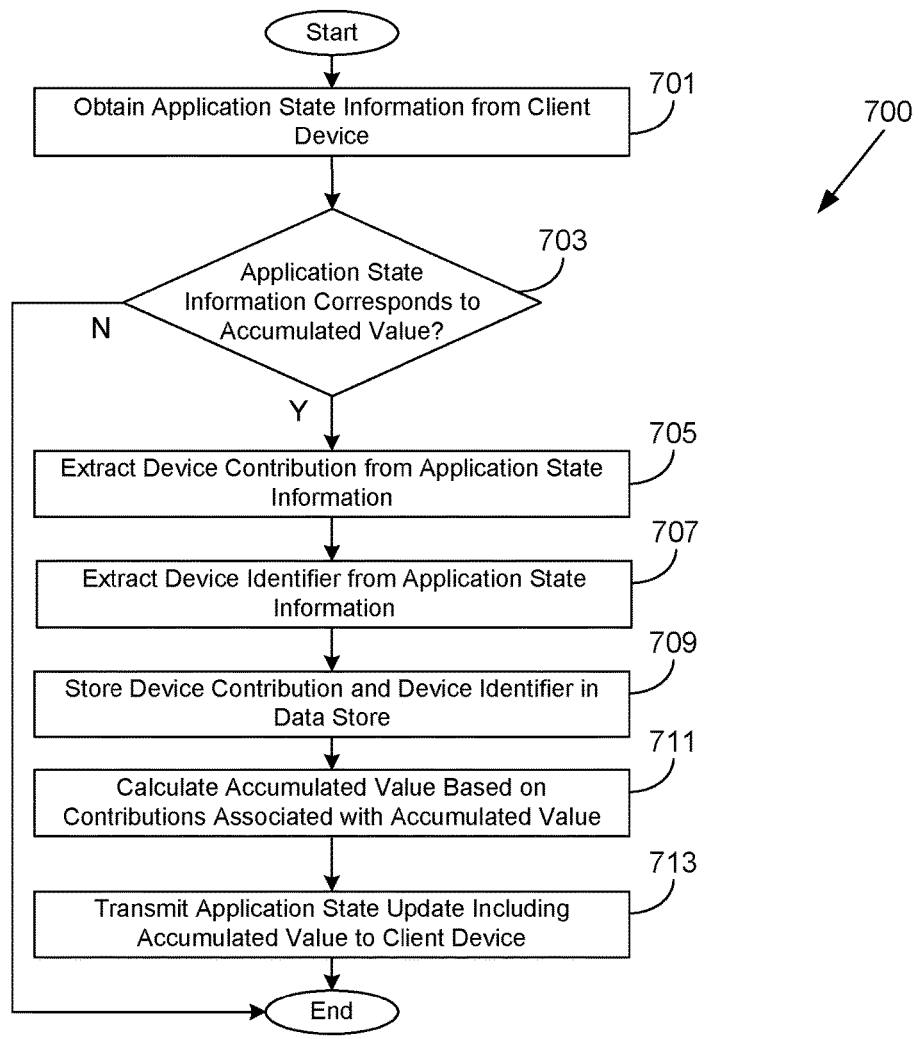
FIG. 7 is a flowchart illustrating one example of functionality implemented as portions of an application synchronization service executed in a computing environment according to various embodiments of the present disclosure.

Referring next to FIG. 7, shown is a flowchart 700 that provides one example of execution of the application synchronization service 221 executed by a computing environment 203 according to various embodiments to process application state information 241 that includes data related to an accumulating value. It is understood that the flowchart of FIG. 7 provides merely an example of the many different types of functional arrangements that may be employed to implement the operation of the portion of an application synchronization service 221 as described herein. As an alternative, the flowchart of FIG. 7 may be viewed as depicting an example of steps of a method implemented in the computing environment 203 according to one or more embodiments.

Beginning with box 701, the application synchronization service 221 obtains application state information 241 via a network 209. The application state information 241 is formatted according to a data format as described herein. At box 703, the application synchronization service 221 determines whether the application state information 241 includes data relating to an accumulating value that is synchronized by the application synchronization service 221 across multiple client devices 103 that are associated with a user account.

At box 705, the application synchronization service 221 extracts a numeric value corresponding to a contribution to the accumulating value that is associated with the client device 103. At box 707, the application synchronization service 221 extracts a device identifier corresponding to the client device 103 from which the application state information 241 was received. At box 709, the application synchronization service 221 stores the contribution and device identifier in association with a key 255 corresponding to the accumulating value in the data store 212.

At box 711, the application synchronization service 221 calculates the accumulating value based upon the contributions of the various client devices 103 that are linked with the user account associated with the client device 103 from which the application state information 241 was received. For example, the application synchronization service 221 can sum the various contributions associated with the various client devices 103 that are stored in association with a particular key 255 that is in turn associated with a particular user account. At box 713, the application synchronization service 221 can send an application state update 245 that includes the accumulating value to the requesting client device 103. Thereafter, the process ends.

Figure 8:
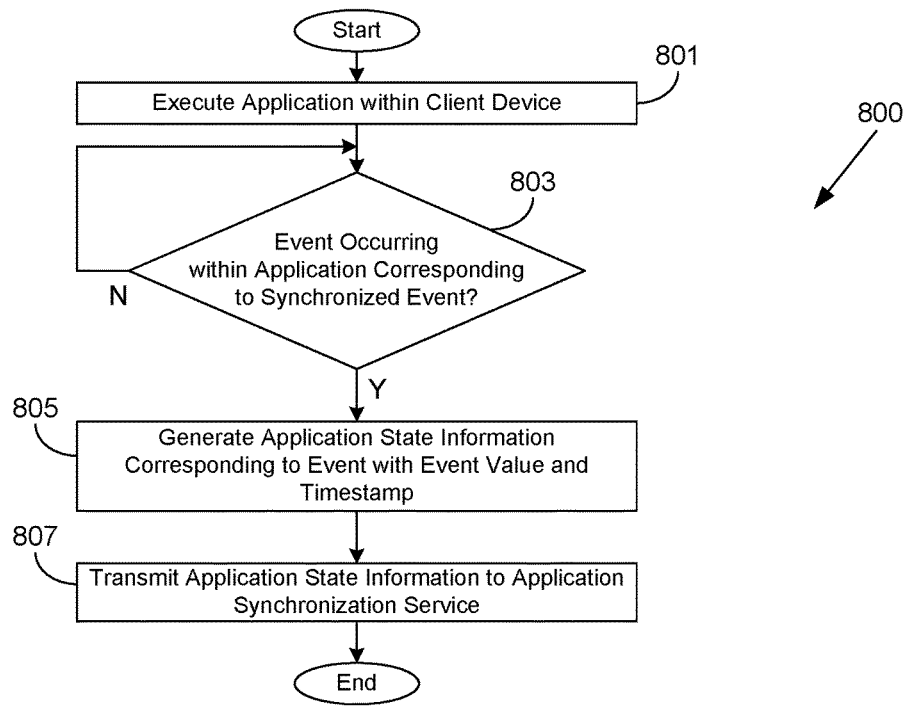
FIG. 8 is a flowchart illustrating one example of functionality implemented as portions of an application executed in a client device according to various embodiments of the present disclosure.

Referring next to FIG. 8, shown is a flowchart 800 that provides one example of execution of an application 233 executed by a client device 103 to generate application state information 241 or a portion of application state information 241 according to various embodiments. It is understood that the flowchart of FIG. 8 provides merely an example of the many different types of functional arrangements that may be employed to implement the operation of the portion of an application 233 as described herein. As an alternative, the flowchart of FIG. 8 may be viewed as depicting an example of steps of a method implemented in the client device 103 that reports application state information to the application synchronization service 221 for synchronization of state information across multiple devices of a user according to one or more embodiments.

First, in box 801, the application 233 executes functionality associated with the application 233 in a client device 103. As noted above, the application 233 has been instrumented by a developer to generate application state information 241 corresponding to events that the developer wishes to synchronize across multiple devices associated with a user account. At box 803, the application 233 determines whether an event corresponding to data that is synchronized across multiple client devices 103 associated with a user account has occurred. At box 805, the application 233 generates application state information 241 that incorporates data associated with the event, such as an event name and/or event value. The application state information 241 also includes a timestamp that is generated by the client device 103 in which the application 233 is executed. At box 807, the application 233 transmits the application state information 241 to the application synchronization service 221.

Figure 9:
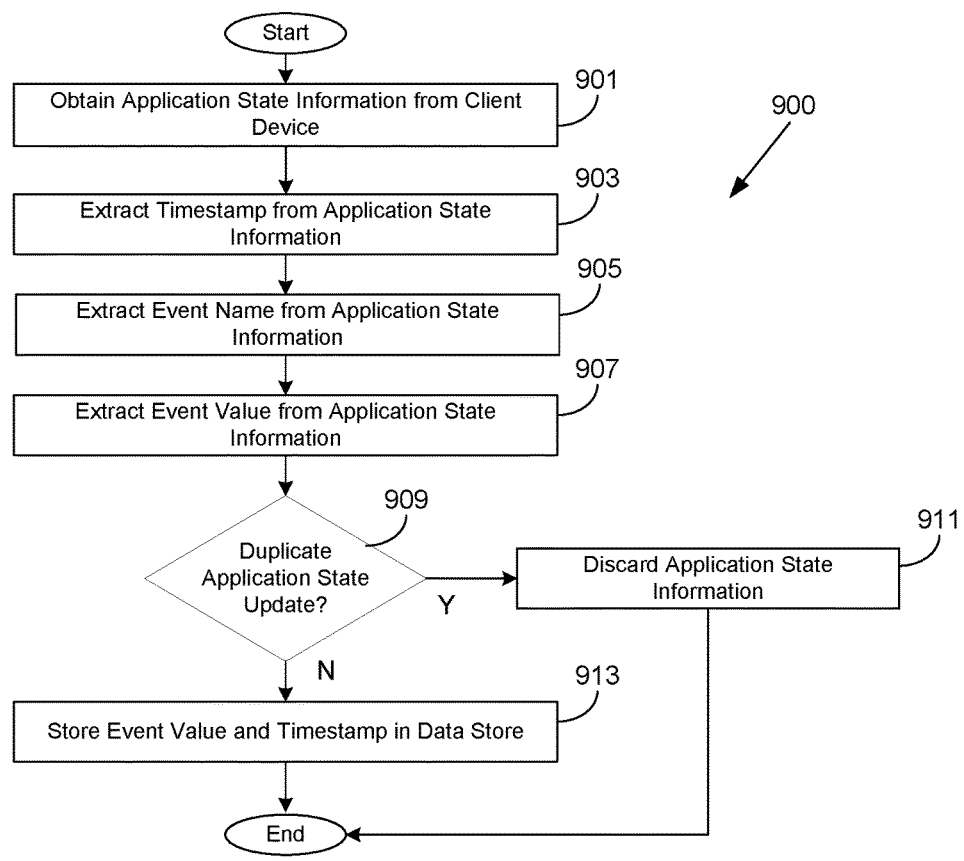
FIG. 9 is a flowchart illustrating one example of functionality implemented as portions of an application synchronization service executed in a computing environment according to various embodiments of the present disclosure.

Referring next to FIG. 9, shown is a flowchart 900 that provides one example of execution of the application synchronization service 221 executed by a computing environment 203 according to various embodiments to process application state information 241. It is understood that the flowchart of FIG. 9 provides merely an example of the many different types of functional arrangements that may be employed to implement the operation of the portion of an application synchronization service 221 as described herein. As an alternative, the flowchart of FIG. 9 may be viewed as depicting an example of steps of a method implemented in the computing environment 203 according to one or more embodiments.

Beginning with box 901, the application synchronization service 221 obtains application state information 241 via a network 209. The application state information 241 is formatted according to a data format as described herein. At box 903, the application synchronization service 221 extracts a timestamp from the application state information 241. At box 905, the application synchronization service 221 extracts an event name from the application state information 241 within a data structure within the application state information 241. At box 907, the application synchronization service 221 extracts an event value from the application state information 241. At box 909, the application synchronization service 221 determines whether the application state information is a duplicate based upon the timestamp. If the application state information 241 is a duplicate, then at box 911, the application synchronization service discards the application state information 241. If the application state information 241 is not a duplicate, then at box 913 the application synchronization service 221 stores the event value as a value 257 in the data store 212 as well as the timestamp in association with the event value in the data store so that the application synchronization service 221 can determine whether subsequent application state information 241 data structures received from client devices 103 are duplicates.

Figure 10:
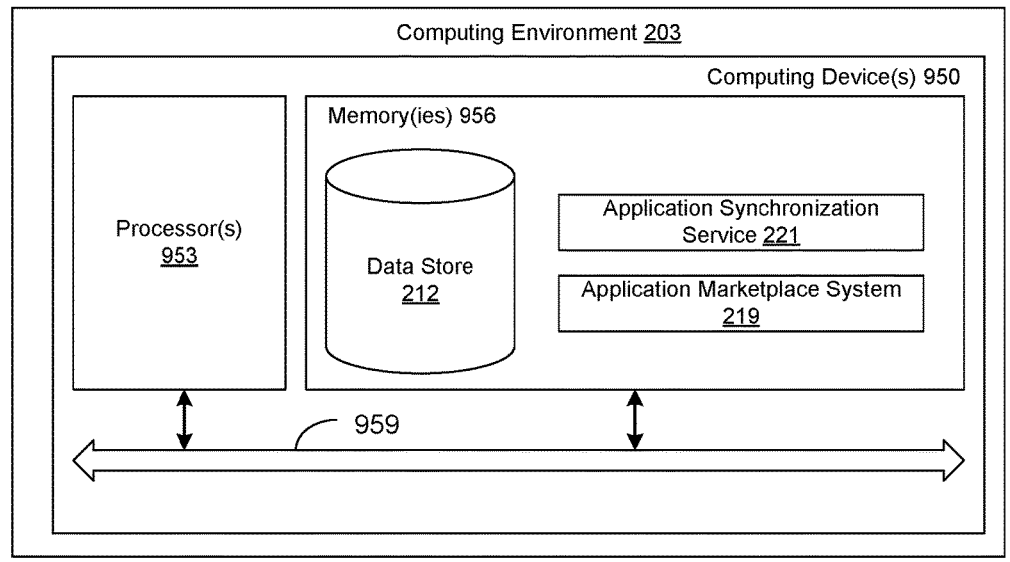
FIG. 10 is a schematic block diagram that provides one example illustration of a computing environment employed in the networked environment of FIG. 2 according to various embodiments of the present disclosure.

With reference to FIG. 10, shown is a schematic block diagram of the computing environment 203 according to an embodiment of the present disclosure. The computing environment 203 includes one or more computing devices 900. Each computing device 900 includes at least one processor circuit, for example, having a processor 953 and a memory 956, both of which are coupled to a local interface 959. To this end, each computing device 900 may comprise, for example, at least one server computer or like device. The local interface 959 may comprise, for example, a data bus with an accompanying address/control bus or other bus structure as can be appreciated.

Stored in the memory 956 are both data and several components that are executable by the processor 953. In particular, stored in the memory 956 and executable by the processor 953 are the application marketplace system 219, application synchronization service 221, and potentially other applications. Also stored in the memory 956 may be a data store 212 and other data. In addition, an operating system may be stored in the memory 956 and executable by the processor 953.

Figure 11:
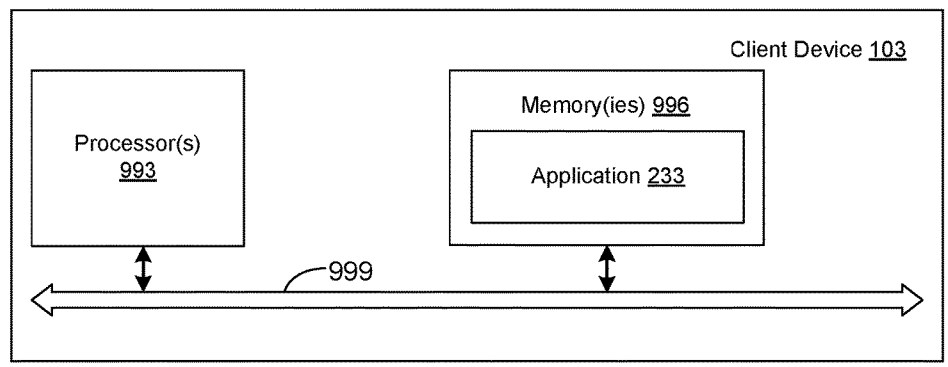
FIG. 11 is a schematic block diagram that provides one example illustration of a client device employed in the networked environment of FIG. 2 according to various embodiments of the present disclosure.

With reference to FIG. 11, shown is a schematic block diagram of the client device 103 according to an embodiment of the present disclosure. The client device 103 includes at least one processor circuit, for example, having a processor 993 and a memory 996, both of which are coupled to a local interface 999. The local interface 999 may comprise, for example, a data bus with an accompanying address/control bus or other bus structure as can be appreciated. A display may also be coupled to the local interface 999.

Stored in the memory 996 are both data and several components that are executable by the processor 993. In particular, stored in the memory 956 and executable by the processor 993 are an application 233 and potentially other applications and/or software. In addition, an operating system may be stored in the memory 996 and executable by the processor 993.

It is understood that there may be other applications that are stored in the memory 956, 996 and are executable by the processor 953, 993 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 956, 996 and are executable by the processor 953, 993. In this respect, the term "executable" means a program file that is in a form that can ultimately be run by the processor 953, 993. Examples of executable programs may be, for example, a compiled program that can be translated into machine code in a format that can be loaded into a random access portion of the memory 956, 996 and run by the processor 953, 993, source code that may be expressed in proper format such as object code that is capable of being loaded into a random access portion of the memory 956, 996 and executed by the processor 953, 993, or source code that may be interpreted by another executable program to generate instructions in a random access portion of the memory 956, 996 to be executed by the processor 953, 993, etc. An executable program may be stored in any portion or component of the memory 956, 996 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 956, 996 is defined herein as including both volatile and nonvolatile memory and data storage components. Volatile components are those that do not retain data values upon loss of power. Nonvolatile components are those that retain data upon a loss of power. Thus, the memory 956, 996 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 953, 993 may represent multiple processors 953, 993 and/or multiple processor cores and the memory 956, 996 may represent multiple memories 956, 996 that operate in parallel processing circuits, respectively. In such a case, the local interface 959, 999 may be an appropriate network that facilitates communication between any two of the multiple processors 953, 993, between any processor 953, 993 and any of the memories 956, 996, or between any two of the memories 956, 996, etc. The local interface 959, 999 may comprise additional systems designed to coordinate this communication, including, for example, performing load balancing. The processor 953, 993 may be of electrical or of some other available construction.

Although the application marketplace system 219, application synchronization service 221 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIG. 6-9 show the functionality and operation of an implementation of portions of the application synchronization service 221 and/or application 233 executed by a client device 103. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 953, 993 in a computer system or other system. The machine code may be converted from the source code, etc. If embodied in hardware, each block may represent a circuit or a number of interconnected circuits to implement the specified logical function(s).

Although the flowcharts of FIG. 6-9 show a specific order of execution, it is understood that the order of execution may differ from that which is depicted. For example, the order of execution of two or more blocks may be scrambled relative to the order shown. Also, two or more blocks shown in succession in flowcharts of FIG. 6-9 may be executed concurrently or with partial concurrence. Further, in some embodiments, one or more of the blocks shown in flowcharts of FIG. 6-9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the application synchronization service 221, application 233, or any other application or service, that comprises software or code can be embodied in any non-transitory computer-readable medium for use by or in connection with an instruction execution system such as, for example, a processor 953, 993 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
a client device registered to a user account within an application synchronization service, the client device configured to execute an application, the application configured to cause the client device to at least:
generate application state information associated with the application, the application state information including an event being associated with an accumulating value;
populate a data structure within the application state information specifying a contribution to the accumulating value stored on the client device, the contribution to the accumulating value stored on the client device being associated with the client device; and
transmit the application state information to the application synchronization service.

2. The system of claim 1, wherein the application further causes the client device to at least:
determine that the client device has not reported the contribution to the accumulating value stored on the client device to the application synchronization service;
obtain a value corresponding to the contribution to the accumulating value by the client device that is stored in the application synchronization service; and
combine the contribution to the accumulating value stored on the client device with the value to generate a combined contribution.

3. The system of claim 2, wherein the application further causes the client device to at least transmit the combined contribution to the application synchronization service.

4. The system of claim 2, wherein the application further determines that the client device has not reported the contribution to the accumulating value stored on the client device to the application synchronization service based upon a flag stored along with the contribution to the accumulating value stored on the client device.

5. The system of claim 1, wherein the data structure comprises a numeric value corresponding to the contribution to the accumulating value stored on the client device.

6. The system of claim 1, wherein the data structure further comprises a device identifier identifying the client device with respect to other client devices.

7. The system of claim 1, wherein the data structure comprises a text-based data interchange format.

8. The system of claim 1, wherein the application further causes the client device to at least obtain, from the application synchronization service, another data structure comprising at least one other contribution to the accumulating value corresponding to at least one other client device associated with the user account.

9. The system of claim 8, wherein the application further causes the client device to at least calculate the accumulating value by summing the contribution to the accumulating value stored on the client device and the at least one other contribution to the accumulating value.

10. A method, comprising:
obtaining, by at least one computing device, a data structure including application state information associated with one of a plurality of client devices, the plurality of client devices being associated with a user account, wherein the data structure includes a key and a value;
identifying, by the at least one computing device, an accumulating value associated with the user account that corresponds to the key, the accumulating value being stored in a data store;
storing, by the at least one computing device, the key and the value in association with the accumulating value in the data store; and
updating, by the at least one computing device, the accumulating value associated with the key based at least in part upon at least one other value that is also associated with the accumulating value in the data store.

11. The method of claim 10, further comprising:
obtaining, by the at least one computing device, another data structure comprising another contribution to the accumulating value, the another contribution corresponding to another of the plurality of devices; and
storing, by the at least one computing device, another key and another value extracted from the another data structure in association with the accumulating value.

12. The method of claim 11, further comprising updating, by the at least one computing device, the accumulating value at least in part upon the value and the another value.

13. The method of claim 11, further comprising updating, by the at least one computing device, the accumulating value by summing the value and the another value.

14. The method of claim 11, further comprising transmitting, in response to obtaining the data structure, a response data structure to the one of the plurality of client devices, the response data structure including the value and the another value.

15. A method, comprising:
generating, by a client device, application state information associated with the application, the application state information including an event being associated with an accumulating value;
populating, in the client device, a data structure within the application state information specifying a contribution to the accumulating value stored on the client device, the contribution to the accumulating value stored on the client device being associated with the client device; and
transmitting, from the client device, the application state information to an application synchronization service.

16. The method of claim 15, further comprising:
determining, in the client device, that the client device has not reported the contribution to the accumulating value stored on the client device to the application synchronization service;
obtaining, by the client device, a value corresponding to the contribution to the accumulating value by the client device that is stored in the application synchronization service; and
combining, by the client device, the contribution to the accumulating value stored on the client device with the value to generate a combined contribution.

17. The method of claim 16, further comprising transmitting, from the client device, the combined contribution to the application synchronization service.

18. The method of claim 16, further comprising determining, by the client device, that the client device has not reported the contribution to the accumulating value stored on the client device to the application synchronization service based upon a flag stored along with the contribution to the accumulating value stored on the client device.

19. The method of claim 15, further comprising obtaining, from the application synchronization service, another data structure comprising at least one other contribution to the accumulating value corresponding to at least one other client device associated with a user account.

20. The method of claim 19, further comprising calculating, by the client device, the accumulating value by summing the contribution to the accumulating value stored on the client device and the at least one other contribution to the accumulating value.

* * * * *